Oct. 16, 1923.
B. L. SMITH
VEHICLE WHEEL
Filed April 28, 1919
1,471,011
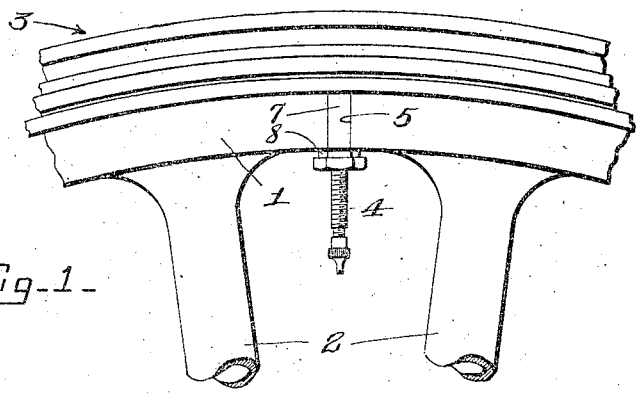
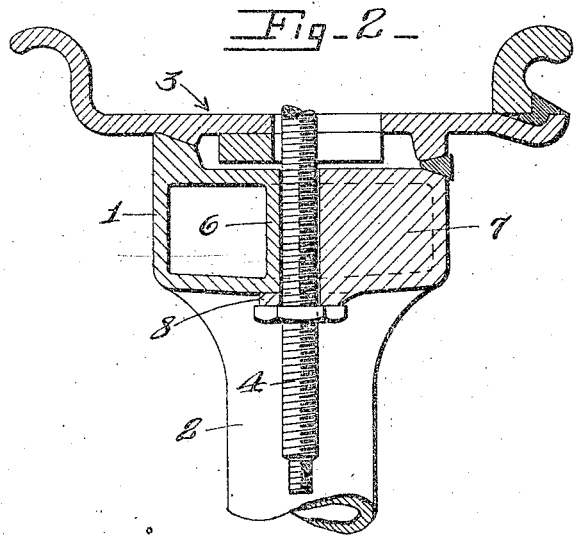
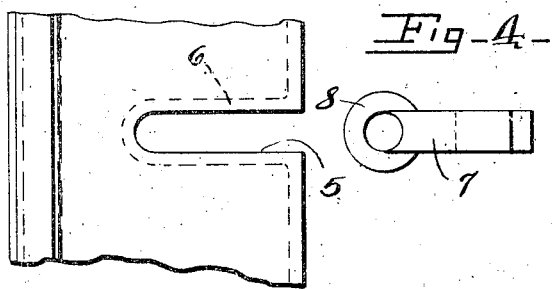
INVENTOR.
Binns L. Smith
BY
Parsons & Ridell
ATTORNEYS.

UNITED STATES PATENT OFFICE.

BURNS LYMAN SMITH, OF SYRACUSE, NEW YORK.

VEHICLE WHEEL.

Application filed April 28, 1919. Serial No. 293,120.

*To all whom it may concern:*

Be it known that I, BURNS LYMAN SMITH, a citizen of the United States, and a resident of Syracuse, in the county of Onondaga and State of New York, have invented a certain new and useful Vehicle Wheel, of which the following is a specification.

This invention relates to vehicle wheels provided with pneumatic tires and has for its object a particularly simple and efficient rim construction by which the tires and demountable rims, especially heavy tires and rims are readily placed on the felloe without undue lifting to insert the valve stem through the hole in the felloe.

In describing this invention, reference is had to the accompanying drawings in which like characters designate corresponding parts in all the views.

Figure 1 is a fragmentary side elevation of a wheel embodying my invention.

Figure 2 is an enlarged fragmentary cross sectional view.

Figure 3 is a fragmentary view of the rim; and

Figure 4 is a plan view of the closure shown in Figure 3.

1 designates the felloe of a wheel which is here shown as hollow cast metal having integral hollow spokes 2.

The wheel is here shown as provided with a demountable rim 3 held in position in any suitable manner. The rim may be of any suitable construction.

4 is the valve stem of a pneumatic tire on the rim 3. The rim is formed with a passage or a transverse slot 5 opening through its peripheral and inner faces and also through one of the lateral sides of the rim, the slot extending but part way across the felloe. In hollow cast wheels, the slot is formed during the casting of the wheel and is bounded by walls or webs 6.

7 is a filler or closure for the slot 5, this closure having means for engaging the valve stem 4 extending through the inner end of the slot 5. Said means is here illustrated as a flat ring or washer 8 encircling the stem and overlying the inner face of the rim.

In operation, in placing a tire on or off the wheel the tire is moved laterally and carries the valve stem through the slot 5, the closure moving with the stem into or out of the slot.

This wheel construction is particularly advantageous as heavy tires can be readily mounted on and removed from the wheel without lifting the valve stem to clear the rim and without manipulation to guide the stem into a small hole.

What I claim is:

A vehicle wheel having means for supporting a pneumatic tire, the rim of the wheel being formed with a transverse slot for receiving the valve stem of the tire, the slot extending partly through the rim from one side thereof and opening through the inner and peripheral faces of the rim, and a closure for the slot comprising a block for filling or substantially fitting the slot, the block being provided with a washer encircling the valve stem, substantially as and for the purpose set forth.

In testimony whereof, I have hereunto signed my name, at Syracuse, in the county of Onondaga, and State of New York, this 19th day of April, 1919.

BURNS LYMAN SMITH.